United States Patent [19]

Filtri et al.

[11] Patent Number: 4,738,479
[45] Date of Patent: Apr. 19, 1988

[54] MOBILE CAR STABILIZER ACTUATING DEVICE

[75] Inventors: Luigi Filtri, Turin; Luciano Possetti, Carmagnola; Lamberto Melotti, Turin, all of Italy

[73] Assignee: Fiat Auto S.p.A., Turin, Italy

[21] Appl. No.: 928,889

[22] Filed: Nov. 10, 1986

[30] Foreign Application Priority Data

Nov. 12, 1985 [IT] Italy .............. 67954 A/85

[51] Int. Cl.$^4$ ............................. B62D 35/00
[52] U.S. Cl. ............................. 296/1 S; 244/199
[58] Field of Search .............. 296/1 S, 91, 165; D12/333, 334, 339; 244/213, 199

[56] References Cited

U.S. PATENT DOCUMENTS

| | | | |
|---|---|---|---|
| 4,117,995 | 10/1978 | Runge | 244/199 |
| 4,120,470 | 10/1978 | Whitner | 244/213 |
| 4,174,083 | 11/1979 | Mohn | 244/199 |

FOREIGN PATENT DOCUMENTS

| | | | |
|---|---|---|---|
| 2649953 | 5/1978 | Fed. Rep. of Germany | 296/1 S |
| 3003565 | 8/1981 | Fed. Rep. of Germany | 296/1 S |
| 3019150 | 11/1981 | Fed. Rep. of Germany | 296/1 S |
| 3133961 | 4/1983 | Fed. Rep. of Germany | 244/213 |
| 3520971 | 9/1986 | Fed. Rep. of Germany | 296/1 S |

Primary Examiner—David A. Scherbel
Assistant Examiner—Carol L. Olson
Attorney, Agent, or Firm—Shlesinger, Arkwright & Garvey

[57] ABSTRACT

A device comprising a movable panel, designed to support a stabilizer by means of at least one rib; an opening in the car bodywork, the edge of which opening presents substantially the same shape as the stabilizer contour and the aforementioned panel contour; and actuating means designed to move the aforementioned panel from a first position, wherein the upper surface of the stabilizer is substantially flush with the edge of the opening which is thus closed off by the aforementioned stabilizer, into a second position wherein the panel is arranged substantially flush with the edge of the opening which is thus closed off by the aforementioned panel.

20 Claims, 2 Drawing Sheets

MOBILE CAR STABILIZER ACTUATING DEVICE

BACKGROUND OF THE INVENTION

The present invention relates to a device for activating a mobile car stabilizer, designed to move from an idle position wherein it is housed inside a compartment in the car bodywork, to an operating position wherein it is located outside the contour of the bodywork and exposed to the air stream flowing over the bodywork. Known devices for moving a stabilizer from the first to the second position comprise a train of articulated members, a first of which is powered by a motor, and the last of which is connected to the stabilizer in such a manner as to move the same, via a fairly complex movement, from the said first to the said second position. Known devices of the aforementioned type present a number of drawbacks. First and foremost, in addition to being fairly complex in design and cumbersome in size, the compartment (in which the stabilizer is housed in the idle position) usually remains open and is therefore exposed to external agents when the stabilizer is moved into the operating position.

SUMMARY OF THE INVENTION

The aim of the present invention is to provide a device for activating a mobile stabilizer of the aforementioned type, but involving none of the aforementioned drawbacks, i.e. a device of compact size and highly straightforward construction and design, which provides for closing of the compartment even with the stabilizer set in the operating position.

A further aim of the present invention is to provide a device of the aforementioned type which can be housed inside a cavity formed in the boot lid on the car.

With this aim in view, according to the present invention, there is provided a mobile car stabilizer actuating device, designed to move from an idle position, wherein the stabilizer is housed inside a compartment in the car bodywork, into an operating position; characterized by the fact that it comprises a movable panel designed to support the stabilizer by means of at least one rib; an opening in the bodywork, the edge of which opening presents substantially the same shape as the stabilizer contour and the panel contour; and actuating means designed to move the panel from a first position, wherein the upper surface of the stabilizer is substantially flush with the edge of the said opening which is thus closed off by the stabilizer, into a second position wherein the panel is arranged substantially flush with the said edge of the opening which is thus closed off by the said panel.

BRIEF DESCRIPTION OF THE DRAWINGS

The present invention will be described by way of example with reference to the accompanying drawings, in which.

DETAILED DESCRIPTION OF THE INVENTION

Figure 1:
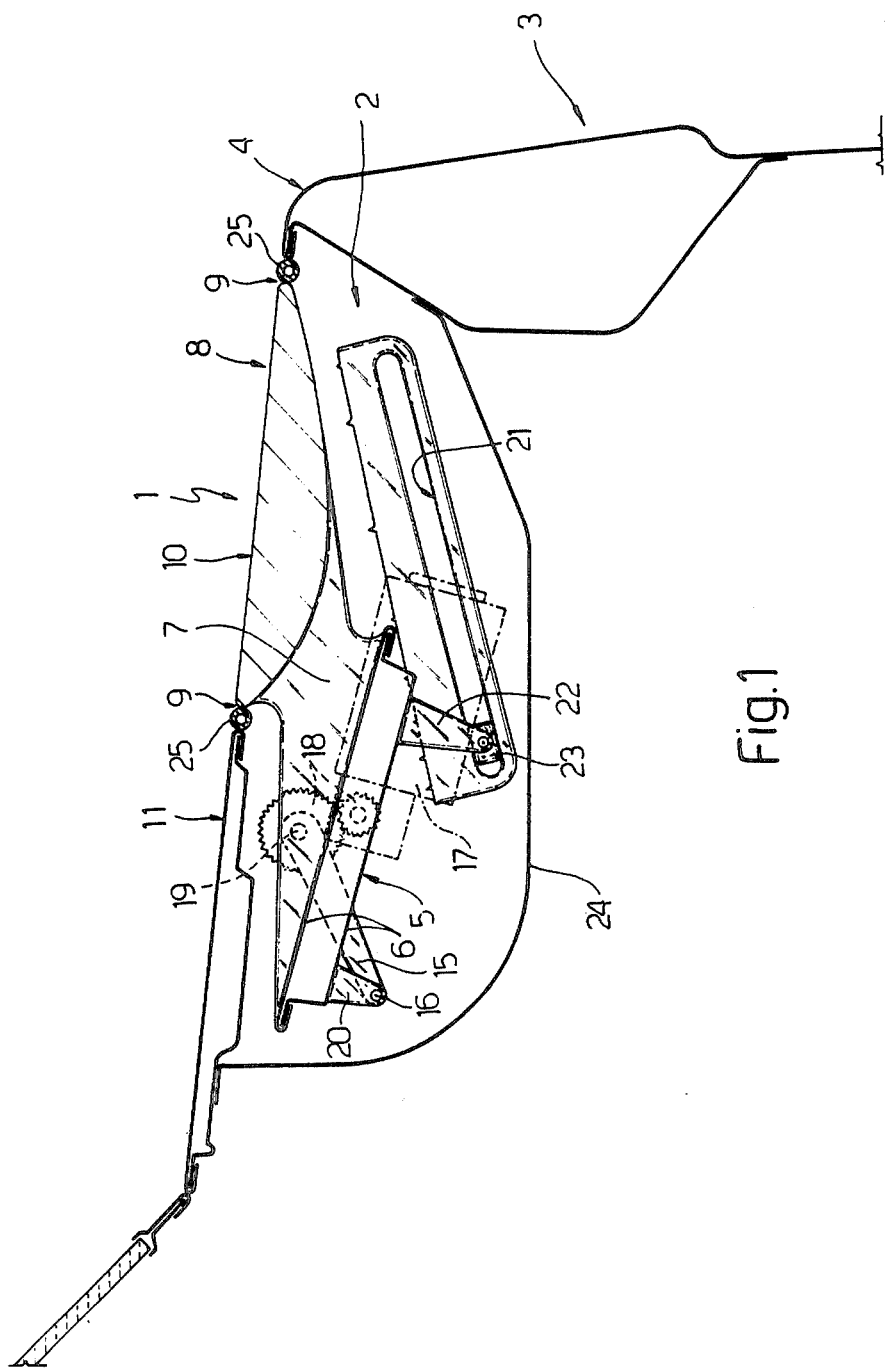
FIG. 1 is a schematic cross sectional view of the device according to the present invention in a first position, wherein the stabilizer is arranged in the idle position.
Figure 2:
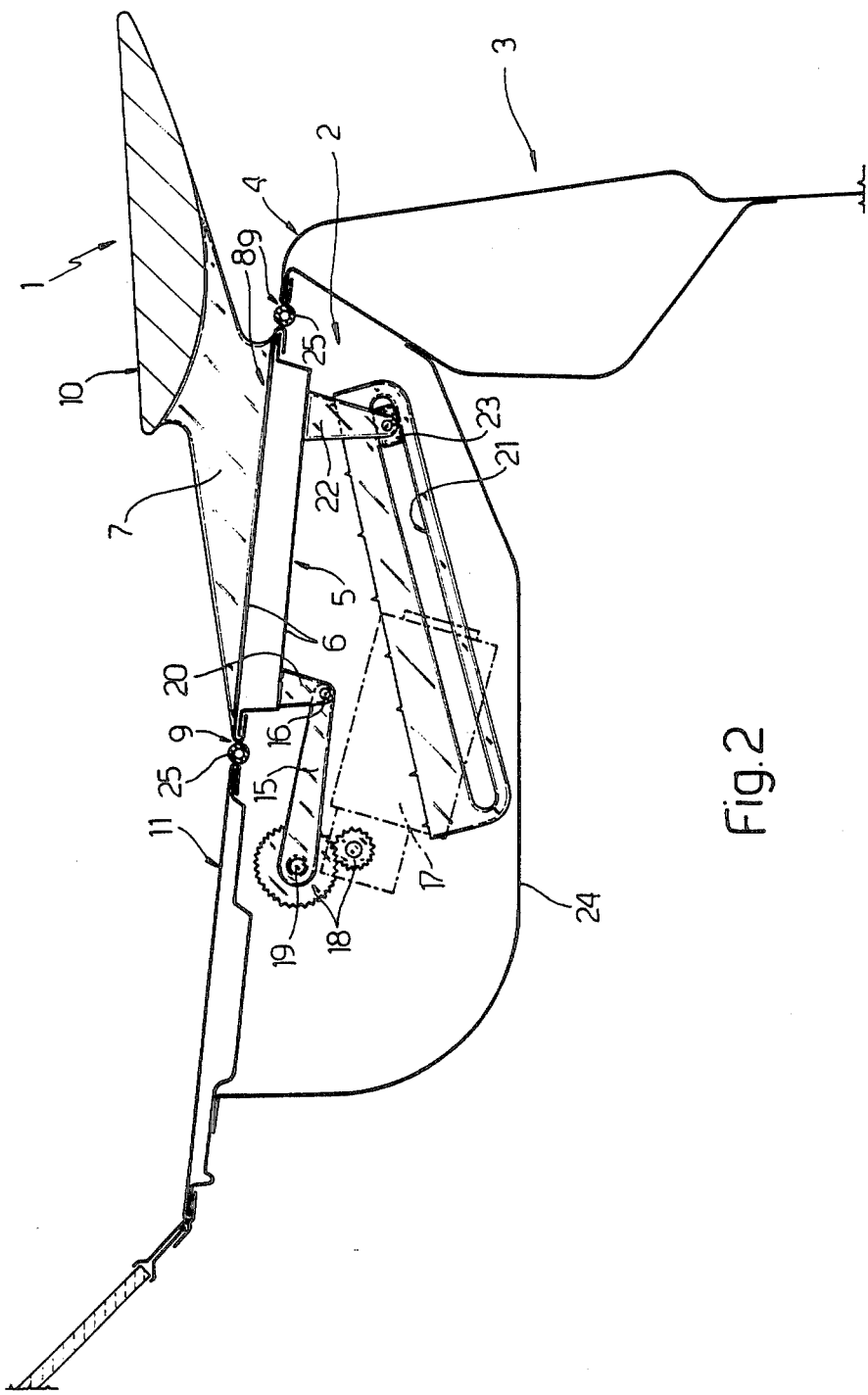
FIG. 2 is another schematic cross sectional view of the device in a second position, wherein the stabilizer is arranged in the operating position.

The device according to the present invention is designed to move stabilizer 1 between a first position, as shown in FIG. 1 and wherein stabilizer 1 is housed inside a compartment 2 formed in the bodywork 3 of the car, and a second position, as shown in FIG. 2 and wherein the stabilizer 1 is arranged in an operating position outside the compartment 2 and exposed to the air stream flowing over the bodywork 3.

In the embodiment shown, the compartment 2 is formed underneath the boot lid 4 of the car, which, as described in more detail later on, is an ideal location for the device according to the present invention.

The device according to the present invention comprises a panel 5 formed in any appropriate manner, e.g. by means of a pair of sheet metal walls 6 or a second stabilizer formed, for example, from plastic; which panel 5 is designed to support stabilizer 1 by means of at least one, but in this case, conveniently, two ribs 7.

The device according to the present invention also comprises an opening 8 formed in lid 4, the edge 9 of which opening 8 presents substantially the same shape as the respective contours of stabilizer 1 and panel 5. The contours of the two parts, which are substantially identical, are preferably rectangular, but may be of any other shape. Conveniently, surface 10, defining the top of stabilizer 1, is shaped in such a manner as to blend with upper surface 11 of lid 4 when stabilizer 1 is set in the first position illustrated in FIG. 1.

The device according to the present invention also comprises actuating means for moving panel 5 between a first position, as shown in FIG. 1 and wherein upper surface 10 is substantially flush with edge 9 of opening 8 (thus blending with surface 11 of lid 4) and opening 8 is closed off by stabilizer 1, and a second position, as shown in FIG. 2 and wherein panel 5 is substantially flush with the said edge 9 and the opening 8 is closed off by panel 5 itself.

The actuating means comprises a crank 15 mounted for rotation about a shaft 19 and controlled by an electric motor 17 via a pair of gears 18. By means of a pin 16, the end of the crank 15 is hinged to a first point of panel 5, located underneath the panel 5 and on a bracket 20 integral with the same. The device according to the present invention also comprises a guide member 21 designed to guide a second point of panel 5 in a given prearranged direction when the said first point is moved by crank 15 in the arc of a circle.

The second point is also located underneath panel 5 and on a bracket 22 integral with the same. The bracket 22 conveniently comprises a shoe 23 designed to slide within guide member 21 and which is, conveniently, straight, as shown clearly in the attached drawings. The actuating means are conveniently arranged on one or both sides of panel 5; crank 15, together with gears 18 and motor 17 are arranged on one side, whereas one of guide members 21, together with respective shoe 23, is conveniently located on either side of panel 5.

All parts of the members are housed inside compartment 2, which is closed off at the bottom by a wall 24 integral with lid 4, in such a manner as to enable lid 4 to be opened for enabling access to the boot.

The edge 9 of opening 8 is fitted with a sealing member 25 designed to seal with the matching edges of stabilizer 1 and panel 5. The sealing member 25 conveniently consists of a section of flexible material, for example, of round cross section, secured in any appropriate manner to edge 9 and designed to be flexed by the respective edges of stabilizer 1 and panel 5.

The device as described operates as follows.

When idle, the device is arranged in the first position, as shown in FIG. 1, wherein the edge of stabilizer 1 contacts sealing member 25 so as to close off opening 8 in a substantially sealed manner. In such position, upper surface 10 of stabilizer 1 blends with surface 11 of lid 4 so as to form, with the said surface 11, a single unbroken surface. In this position, crank 15 is located in one of its limit positions, as shown in FIG. 1, which corresponds with one of the limit positions of shoe 23 inside guide member 21.

For moving stabilizer 1 into its operating position, electric motor 17 is operated so as to turn crank 15 counter clockwise, and to thereby cause pin 16 on crank 15 (and, consequently, also the first point of panel 5 hinged to the pin 16) to move substantially through an arc of a circle. Subsequent to such displacement, and by virtue of the respective ties between shoes 23 and guide members 21, the second point of panel 5 is forced to move in a substantially straight line, and panel 5 is henceforth positioned as dictated by the ties. In particular, when crank 15 reaches its limit position, as shown in FIG. 2, shoes 23 are also located in their respective limit positions inside respective guide members 21, and panel 5 is positioned exactly between edges 9 of opening 8, as shown in FIG. 2. In this second position, panel 5 closes off opening 8 in a substantially sealed manner, whereas stabilizer 1 is arranged in its correct operating position exposed to the air stream flowing over the car bodywork.

By operating electric motor 17 for turning crank 15 clockwise, stabilizer 1 may be brought back to its initial idle position as shown in FIG. 1. In each of the two positions, opening 8 is closed off in substantially sealed manner by virtue of the edges of stabilizer 1 or panel 5 cooperating with sealing member 25 and so preventing water or any other foreign external substances from penetrating inside compartment 2. Furthermore, in the first position, no discontinuity exists on account of the presence of stabilizer 1, whereas, in the second position, the position of stabilizer 1 in relation to the bodywork is identical to that of a stabilizer connected in fixed manner to the bodywork. Finally, the actuating device according to the present invention is extremely straightforward, in terms of construction and design, and is highly reliable.

To those skilled in the art it will be clear that changes may be made both to the form and arrangement of the various component parts of the embodiment described herein without, however, departing from the scope of the present invention. In particular, the form of stabilizer 1 and panel 5, as well as the manner in which the former is connected to the latter, may be other than as described and illustrated herein. Furthermore, the device described may be housed in a compartment formed elsewhere than underneath lid 4 of the car boot.

We claim:

1. An automobile stabilizer system, comprising:
   (a) stabilizer means comprising a stabilizer and a support rib extending therefrom, said stabilizer means movable between a first position wherein said stabilizer is flush with an automobile body and a second position remote therefrom;
   (b) a panel including first and second end portions carried by said rib for closing an opening in the vehicle body when said stabilizer means is in said second position;
   (c) linearly extending guide means positioned within the automobile body;
   (d) bracket means operably connected with said panel and one end portion thereof and operably connected with said guide means for being guided therealong; and,
   (e) actuator means for moving said stabilizer means between said positions pivotally connected to said panel at the other end portion thereof so that operation of said actuator means causes said first end portion to pivot and thereby cause said second end portion to be guided along said guide means.

2. The system of claim 1, wherein:
   (a) said bracket and actuator means being operably connected to said panel on a lower surface thereof, said rib extending from an upper surface thereof.

3. The system of claim 1, wherein:
   (a) said upper surface is substantially flat; and,
   (b) said actuator means including a rotatable crank and said crank rotating on a plane disposed generally transverse to said panel and parallel to said guide means.

4. The system of claim 1, wherein:
   (a) said actuator means including a rotatable crank having a first end portion thereof pivotally connected with said panel; and,
   (b) motor means operably connected with a second end portion of said crank for causing rotation thereof.

5. The system of claim 4, wherein:
   (a) first gear means are carried by said crank second end portion; and,
   (b) second gear means are meshingly engaged with said first gear means and operably connected with said motor means so that operation of said motor means causes rotation of said second gear means and thereby rotation of said first gear means and said crank.

6. The system of claim 1, wherein:
   (a) said guide means are straight.

7. The system of claim 6, wherein:
   (a) said guide means including a slot; and,
   (b) a shoe is carried by said bracket means and is slidably received within said slot for being moved therealong.

8. The system of claim 1, wherein:
   (a) a substantial portion of said stabilizer is disposed beyond said bracket means when said stabilizer means is in said second position.

9. The system of claim 6, wherein:
   (a) said guide means being angularly disposed relative to said panel when said stabilizer means is in said second position.

10. The system of claim 4, wherein:
    (a) second bracket means extending from said panel other end portion; and,
    (b) said crank first end portion is pivotally connected to said second bracket means.

11. An automobile stabilizer system, comprising:
    (a) an automobile body having an internal compartment and an opening in an exterior surface thereof communicating with said compartment;
    (b) stabilizer means comprising a stabilizer and a support rib movable between a first position wherein said stabilizer closes said opening and a second position wherein said stabilizer is disposed outwardly of said exterior surface;
(c) panel means carried by said rib for closing said opening when said stabilizer means is in said second position and for being disposed within said compartment when said stabilizer means is in said first position, said panel means including first and second spaced end portion;
(d) linearly extending guide means positioned within said compartment;
(e) means extending from one end portion of said panel means and operably connected with said guide means for being guided thereon; and,
(f) actuation means for moving said stabilizer means between said positions positioned within said compartment and operably connected with said other end portion for causing said other end portion to pivot and thereby causing said guiding means to be guided along said guide means.

12. The system of claim 11, wherein:
(a) said guide means including a slot; and,
(b) said guide means having a portion thereof slidably disposed within said slot.

13. The system of claim 11, wherein:
(a) said actuation means including a rotatable crank having a first end portion pivotally connected with said panel means; and,
(b) motor means disposed within said compartment for rotating said crank.

14. The system of claim 13, wherein:
(a) first gear means being carried by said crank at a second end portion thereof; and,
(b) second gear means being meshingly engaged with said first gear means and operably connected with said motor means so that operation thereof causes rotation of said first and second gear means and thereby of said crank.

15. The system of claim 12, wherein:
(a) said slot being straight and disposed at an angle to said panel means when said stabilizer means is in said second position.

16. The system of claim 15, wherein:
(a) said panel having a trailing edge and a leading edge; and,
(b) seal means disposed about said opening and sealingly engaged with said trailing and leading edges when said stabilizer means is in said second position.

17. The system of claim 16, wherein:
(a) first and second bracket means extending from said panel means and into said compartment;
(b) said first bracket means operably connecting said actuation means with said other end portion; and,
(c) said second bracket means comprising said guiding means.

18. The system of claim 17, wherein:
(a) said leading edge disposed forwardly of said first bracket means and said trailing edge disposed rearwardly of said second bracket means.

19. The system of claim 17, wherein:
(a) said second bracket means having a length exceeding the length of said first bracket means.

20. The system of claim 11, wherein:
(a) said stabilizer having a surface flush with said exterior surface when said stabilizer means is in said second position; and,
(b) said panel means having a surface flush with said exterior surface when said stabilizer means is in said first position.

* * * * *